US012601998B2

(12) United States Patent
Ikeda

(10) Patent No.: US 12,601,998 B2
(45) Date of Patent: Apr. 14, 2026

(54) IMAGE PROCESSING APPARATUS, METHOD OF CONTROLLING IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Toru Ikeda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/796,501

(22) Filed: Aug. 7, 2024

(65) Prior Publication Data

US 2025/0110436 A1 Apr. 3, 2025

(30) Foreign Application Priority Data

Sep. 29, 2023 (JP) ................................ 2023-169308

(51) Int. Cl.
*G03G 15/00* (2006.01)

(52) U.S. Cl.
CPC ..... *G03G 15/5025* (2013.01); *G03G 15/6508* (2013.01)

(58) Field of Classification Search
CPC ............ G03G 15/5016; G03G 15/502; G03G 15/5025; G03G 15/5029; G03G 15/5062; G03G 15/6508
See application file for complete search history.

(56) References Cited

U.S. PATENT DOCUMENTS

| | | | | |
|---|---|---|---|---|
| 2012/0163851 A1* | 6/2012 | Masuyama | ........ | G03G 15/6508 399/81 |
| 2014/0268234 A1* | 9/2014 | Iida | .................... | G06K 15/1882 358/1.15 |
| 2015/0055172 A1* | 2/2015 | Iida | .................... | G06K 15/4065 358/1.15 |
| 2020/0285176 A1* | 9/2020 | Sueoka | .............. | G03G 15/1675 |
| 2024/0377997 A1* | 11/2024 | Ikeda | .................... | G06F 3/1253 |

FOREIGN PATENT DOCUMENTS

| | | |
|---|---|---|
| JP | 2002-029120 A | 1/2002 |
| JP | 2020-012940 A | 1/2020 |

* cited by examiner

*Primary Examiner* — Carla J Therrien
(74) *Attorney, Agent, or Firm* — VENABLE LLP

(57) ABSTRACT

An image processing apparatus registers sheet information including a plurality of set values. When one of the set values included in a first type of sheet information is changed, the first type of sheet information is copied as tentative sheet information for new sheet information, and when a chart print instruction for adjusting image quality of an image being formed on a sheet is received, a first screen selectable for all sheet feeding trays of the plurality of sheet feeding trays is displayed. When a set value included in a second type of sheet information is changed and the chart print instruction is received, a second screen selectable for the sheet feeding tray in which the second type of the sheet information is set and not selectable for the sheet feeding tray in which the second type of the sheet information is not set is displayed.

15 Claims, 12 Drawing Sheets

IMAGE PROCESSING APPARATUS, METHOD OF CONTROLLING IMAGE PROCESSING APPARATUS, AND NON-TRANSITORY COMPUTER-READABLE STORAGE MEDIUM

BACKGROUND OF THE INVENTION

Field of the Invention

The present disclosure relates to an image processing apparatus, a method of controlling the image processing apparatus, and a non-transitory computer-readable storage medium.

Description of the Related Art

Japanese Patent Laid-Open No. 2002-029120 discloses a conventional image processing apparatus in which printing conditions corresponding to respective types of sheets are registered at the time of shipment (hereinafter referred to as Document 1). This image processing apparatus has a function of allowing a user to select a printing condition corresponding to a type of a sheet set in a sheet feeding tray from the registered printing conditions. On the other hand, types of sheets for use in the image processing apparatus have been increased in recent years. Thus, a user sometimes registers a printing condition different from those registered at the time of shipment.

Further, Japanese Patent Laid-Open No. 2020-12940 discloses an image processing apparatus in which the above printing conditions are preregistered for each sheet as sheet profiles (hereinafter referred to as Document 2). For example, the sheet profiles include sheet attributes such as types of sheets. In this image processing apparatus, for example, a media sensor measures a physical property value of a sheet such as a sheet thickness. The measured physical property value of the sheet is used to search a number of sheet profiles for the corresponding sheet profile.

In the prior art as disclosed in Document 1, in a case where a printing condition different from those registered at the time of shipment is newly registered in the image processing apparatus, a host computer connected to the image processing apparatus performs the work of editing the printing conditions. After the editing work, the host computer transmits the content of the editing work to the image processing apparatus and the image processing apparatus performs the work of registration, whereby the new printing condition is registered for each sheet in the image processing apparatus. Thus, the individual registration work for each sheet is repeated over and over again. Accordingly, in the prior art of Document 1, it may take the time and trouble to obtain a printing condition for printing suitable for a sheet and user convenience may be impaired.

On the other hand, the prior art as disclosed in Document 2 also requires the work of measuring a physical property value of a sheet by a media sensor and registering the result of measurement in a sheet profile. This work is performed individually for each sheet profile, that is, for each sheet. Thus, the individual registration work for each sheet is repeated again and again to register physical property values of sheets in sheet profiles. Accordingly, also in the prior art of Document 2, it may take the time and trouble to obtain a sheet profile for printing suitable for a sheet and user convenience may be impaired.

SUMMARY OF THE INVENTION

An image processing apparatus according to an aspect of this disclosure is an image processing apparatus having: a setting unit configured to set sheet information on a sheet including a plurality of set values to each of a plurality of sheet feeding trays; and a registration unit configured to, in a case where an instruction to change at least one of the set values included in the sheet information is received, copy the sheet information as tentative sheet information for new sheet information and register at least one of the sheet feeding trays in association with the tentative sheet information.

Further features of the present invention will become apparent from the following description of exemplary embodiments with reference to the attached drawings.

DESCRIPTION OF THE EMBODIMENTS

Preferred embodiments of this disclosure will be described below in detail with reference to the accompanying drawings. It should be noted that the following embodiments do not limit the matter disclosed herein and not all combinations of features described in the following embodiments are necessarily essential for solving a problem of this disclosure. The same constituent element will be denoted by the same reference number.

System Configuration

Connection Configuration of Server PC 101

Figure 1:
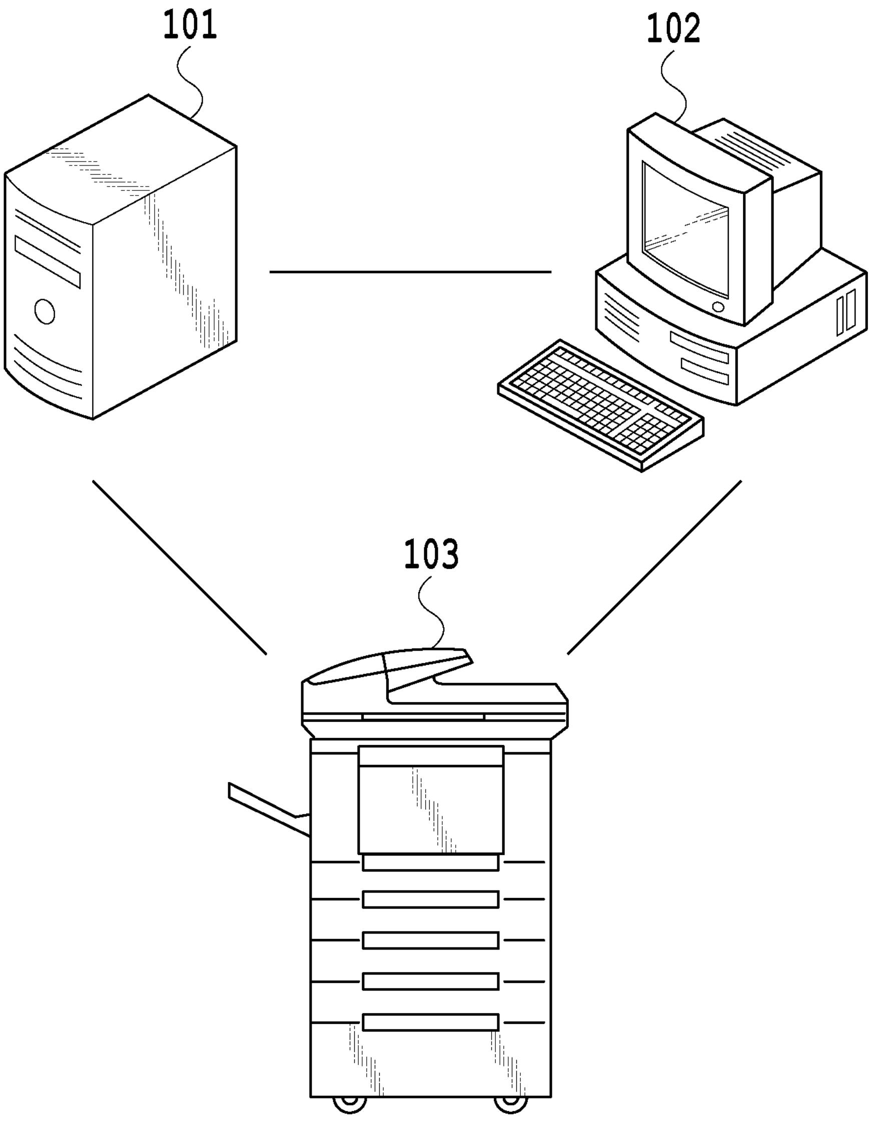
FIG. 1 is a diagram showing an example of a system configuration of an image processing system.

FIG. 1 is a diagram showing an example of a system configuration of an image processing system. The image processing system comprises a server personal computer (PC) 101, a client PC 102, and an image processing apparatus 103. The server PC 101 (also referred to as an information processing apparatus 101) may be configured as a stationary computer. For example, the server PC 101 has functions of various servers such as a file server. The server PC 101 can be connected to each of the client PC 102 and the image processing apparatus 103 via a wired or wireless medium. After establishing communication with the client PC 102 via a wired or wireless medium, the server PC 101 can transmit/receive various signals to/from the client PC 102. Similarly, after establishing communication with the image processing apparatus 103 via a wired or wireless medium, the server PC 101 can transmit/receive various signals to/from the image processing apparatus 103.

Connection Configuration of Client PC 102

The client PC 102 (also referred to as an information processing apparatus 102) may be configured as a stationary computer. The client PC 102 can be connected to each of the server PC 101 and the image processing apparatus 103 via a wired or wireless medium. After establishing communication with the server PC 101 via a wired or wireless medium, the client PC 102 can transmit/receive various signals to/from the server PC 101. Similarly, after establishing communication with the image processing apparatus 103 via a wired or wireless medium, the client PC 102 can transmit/receive various signals to/from the image processing apparatus 103.

Connection Configuration of Image Processing Apparatus 103

The image processing apparatus 103 can be connected to each of the server PC 101 and the client PC 102 via a wired or wireless medium. After establishing communication with the server PC 101 via a wired or wireless medium, the image processing apparatus 103 can transmit/receive various signals to/from the server PC 101. Similarly, after establishing communication with the client PC 102 via a wired or wireless medium, the image processing apparatus 103 can transmit/receive various signals to/from the client PC 102.

Type of Medium

Examples of the wired medium are an optical fiber cable, a twisted pair cable, and a coaxial cable. An example of a communication standard via the wired medium such as Ethernet (registered trademark) is IEEE802.3. An example of the wireless medium is an electromagnetic wave. Examples of a communication standard via the wireless medium are IEEE802.11 and IEEE802.15.1.

Summary of Image Processing Apparatus 103

The image processing apparatus 103 is configured as a multifunction peripheral (MFP). The image processing apparatus 103 has a function of copying an image formed on a print medium such as a paper document (also referred to as a sheet). The image processing apparatus 103 has a function of forming and printing print data on a print medium. The print data is externally transmitted to the image processing apparatus 103. For example, the print data is transmitted from a printer driver external to the image processing apparatus 103. A printing system of the image processing apparatus 103 may be either an electrophotographic system or an inkjet system, or may be any other system. An example of the other system is a thermal transfer system.

The image processing apparatus 103 may have a function of reading an image formed on a print medium to form image data and externally sending the image data (also referred to as a SEND function). A destination of image data transmission is an external file server or a destination designated by an e-mail address. The external file server is, for example, a file server implemented by the function of the server PC 101, but is not limited to this. The external file server may be a server not shown in the drawing. The image processing apparatus 103 may have a function of transmitting various kinds of data to a different image processing apparatus from the image processing apparatus 103 and performing printing in the different image processing apparatus which is the destination of transmission (also referred to as a remote copy function or a facsimile function).

Other Network Configurations

Incidentally, both of the server PC 101 and the client PC 102 may be configured by the same computer. For example, a single computer may have a server module which implements the function of the server PC 101 and a client module which implements the function of the client PC 102. Alternatively, the server PC 101 and the client PC 102 may be configured only by the image processing apparatus 103 by providing the image processing apparatus 103 with a server module which implements the function of the server PC 101 and a client module which implements the function of the client PC 102. Alternatively, the information processing apparatus 102 as the client PC 102 does not have to be configured as a stationary computer. For example, the information processing apparatus 102 as the client PC 102 may be configured as a tablet computer, a notebook computer, or a smartphone.

Hardware Configuration of Image Processing Apparatus 103

Figure 2:
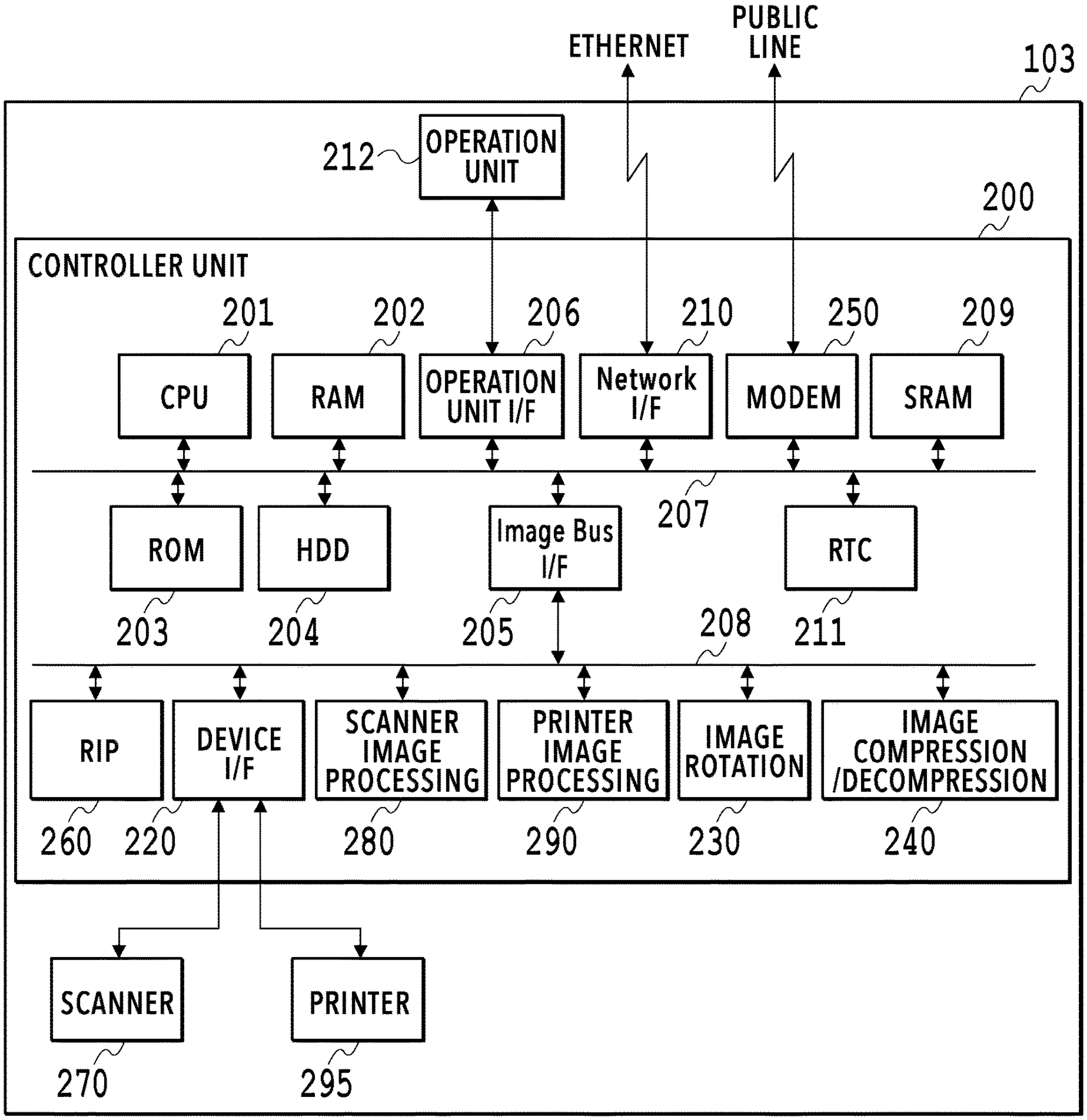
FIG. 2 is a diagram showing an example of a hardware configuration of an image processing apparatus.

FIG. 2 is a diagram showing an example of a hardware configuration of the image processing apparatus 103. The image processing apparatus 103 comprises a controller unit 200, an operation unit 212, a scanner 270, and a printer 295. The scanner 270 is a device which receives input of an image. The printer 295 is a device which outputs an image. The controller unit 200 is connected to at least one of the scanner 270 and the printer 295. The controller unit 200 is connected to the operation unit 212. The controller unit 200 is connected to Ethernet or a public line. With this connection configuration, the controller unit 200 inputs and outputs image information or device information. Alternatively, the controller unit 200 controls at least one of the scanner 270 and the printer 295 based on a content of operation of the operation unit 212. Alternatively, the controller unit 200 may be remotely operated via at least one of the Ethernet and public line. This will be described below in detail.

The operation unit 212 has a feature to receive operation of a user (also referred to as a user of this system) and a feature to display various contents. More specifically, the operation unit 212 has a display screen to display various contents and a hardware key to receive user operation. For example, the display screen is a liquid-crystal display, but is not limited to this. The display screen may be an organic electroluminescence (EL) display. Alternatively, the display screen may be a light-emitting diode (LED) display. What receives user operation may be a touch panel, not a hardware key. In this case, a hardware key and a touch panel may be arranged adjacent to each other so that they can be used in combination. For example, the touch panel may be laminated on a display of some kind such as a liquid-crystal display in a thickness direction of the display and thereby configured as a touch panel display.

Incidentally, the operation is not limited as long as it is an action that transfers a user's intention to this system. For example, in a situation in which a hardware key is operated, the operation means a press of the hardware key. For example, in a situation in which a touch panel is operated, the operation means a touch on the touch panel. For example, in a case where a predetermined place on a screen is clicked with a device such as a mouse, the operation means a click on a desired place.

The controller unit 200 comprises a system bus 207 and an image bus 208. Each of the system bus 207 and the image bus 208 is provided with a plurality of devices. The image bus 208 can transfer image data with high speed. For example, the image bus 208 is configured by a Peripheral Component Interconnect (PCI) bus. The image bus 208 may be configured by an IEEE1394 bus. Here, the IEEE1394 bus means a serial bus compliant with the IEEE1394 standard.

An image bus I/F 205 is arranged between the system bus 207 and the image bus 208. The image bus I/F 205 establishes connection between the system bus 207 and the image bus 208. The image bus I/F 205 is a bus bridge which performs mutual conversion between data structures of data flowing on the system bus 207 and data flowing on the image bus 208.

Each Device Under System Bus 207

First, each device connected to the system bus 207 will be described. A central processing unit (CPU) 201, a random access memory (RAM) 202, and a read-only memory (ROM) 203 are connected to the system bus 207. A hard disc drive (HDD) 204, an operation unit I/F 206, a network I/F 210, and a modem 250 are connected to the system bus 207. A static random access memory (SRAM) 209 and an RTC 211 are connected to the system bus 207.

The CPU 201 is a controller which controls the image processing apparatus 103. The CPU 201 performs various kinds of control via the system bus 207. The ROM 203 is a nonvolatile memory. The ROM 203 stores a boot program for the system. The ROM 203 functions as a boot ROM by activation of the boot program for the system. The RAM 202 is a volatile memory. The RAM 202 functions as a system work memory for operation of the CPU 201. Alternatively, the RAM 202 may function as an image memory to temporarily store image data. That is, programs such as an operating system, system software, and application software and various kinds of data referred to in execution of each program are loaded into the RAM 202 as appropriate. Incidentally, the CPU 201 loads what is stored in the HDD 204 into the RAM 202 as appropriate. The HDD 204 stores programs such as an operating system, system software, and application software and image data. However, a place to store various kinds of data is not limited to the HDD 204. For example, any other storage device may be used, such as a solid state drive (SSD), a secure digital (SD) card, or an embedded multimedia card (eMMC). Alternatively, the CPU 201 may fetch what is stored in a removable semiconductor memory such as a universal serial bus (USB) via an interface not shown in the drawing and load it into the RAM 202.

The operation unit I/F 206 is an interface with the operation unit 212. The operation unit I/F 206 has a function of outputting, for example, image data to the operation unit 212 as information to be displayed on the operation unit 212. Alternatively, the operation unit I/F 206 has a function of receiving information input by a user of this system via the operation unit 212 and transferring it to the CPU 201. The network I/F 210 is an interface with Ethernet. The network I/F 210 connects with Ethernet which is a wired medium and inputs/outputs various kinds of information to/from the information processing apparatuses 101 and 102 connected to the Ethernet. The modem 250 is a device which performs mutual conversion between a digital signal from the image processing apparatus 103 and an analog signal from a public line such as a telephone line. The modem 250 enables the image processing apparatus 103 to input/output various kinds of information including image information to/from the public line. Although not illustrated, an optical network unit (ONU) may be connected to the system bus 207. The ONU is an optical line terminal device which performs mutual conversion between an electric signal and an optical signal. This ONU enables the image processing apparatus 103 to input/output various kinds of information including image information to/from the optical line. The static random access memory (SRAM) 209 is a nonvolatile storage medium capable of high-speed operation. For example, the SRAM 209 is used as a cache memory. The real time clock (RTC) 211 is an integrated circuit which manages the system's time. The RTC 211 has a primary or secondary battery. The RTC 211 thus can manage the system's time even during a shutdown of the main power supply by drawing power from the primary or secondary battery. For example, even in a case where the controller unit 200 is not powered on, the RTC 211 can execute the processing of keeping a time count.

Each Device Under Image Bus 208

Next, devices connected to the image bus 208 will be described. A raster image processor (RIP) 260 and a device I/F 220 are connected to the image bus 208. A scanner image processing unit 280, a printer image processing unit 290, an image rotation unit 230, and an image compression/decompression unit 240 are connected to the image bus 208. The RIP 260 is a constituent element which generates a raster image (also referred to as a bitmap image). More specifically, the RIP 260 interprets a page description language (PDL) code and converts it into a bitmap image. The device I/F 220 is connected to at least one of the scanner 270 and the printer 295 and performs conversion of a synchronous system/asynchronous system of image data. The scanner image processing unit 280 performs correction, processing, and editing of input image data. The printer image processing unit 290 performs printer correction, resolution conversion, and the like for print output image data. The image rotation unit 230 performs rotation of image data. The image compression/decompression unit 24 performs compression and decompression processing.

Software Configuration of Image Processing Apparatus 103

Figure 3:
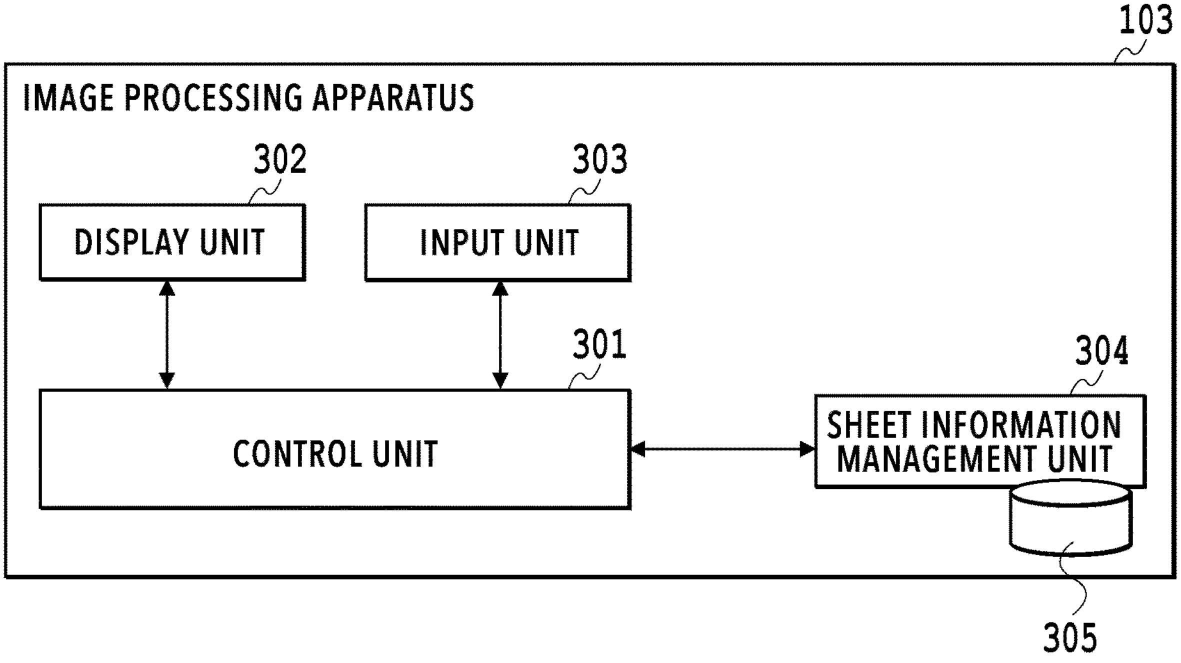
FIG. 3 is a diagram showing an example of a software configuration of the image processing apparatus.

FIG. 3 is a diagram showing an example of a software configuration of the image processing apparatus 103. As described above with reference to FIG. 2, the CPU 201 executes part or all of a program stored in the ROM 203 on the RAM 202 based on the program, thereby implementing functions described below and processing of a flowchart described later. A display unit 302 implements a function of causing the operation unit 212 to display a status of the image processing apparatus 103 or an operation menu. The input unit 303 implements a function of causing the operation unit 212 to receive an operation instruction from a user. A sheet information management unit 304 implements a function of processing various kinds of information and causing a sheet DB 305 to store various kinds of information and the like. A control unit 301 functions as a logical control subject of the image processing apparatus 103. More specifically, the control unit 301 implements a function of a control subject of the display unit 302, the input unit 303, and the sheet information management unit 304.

Sheet Information

Figure 4:
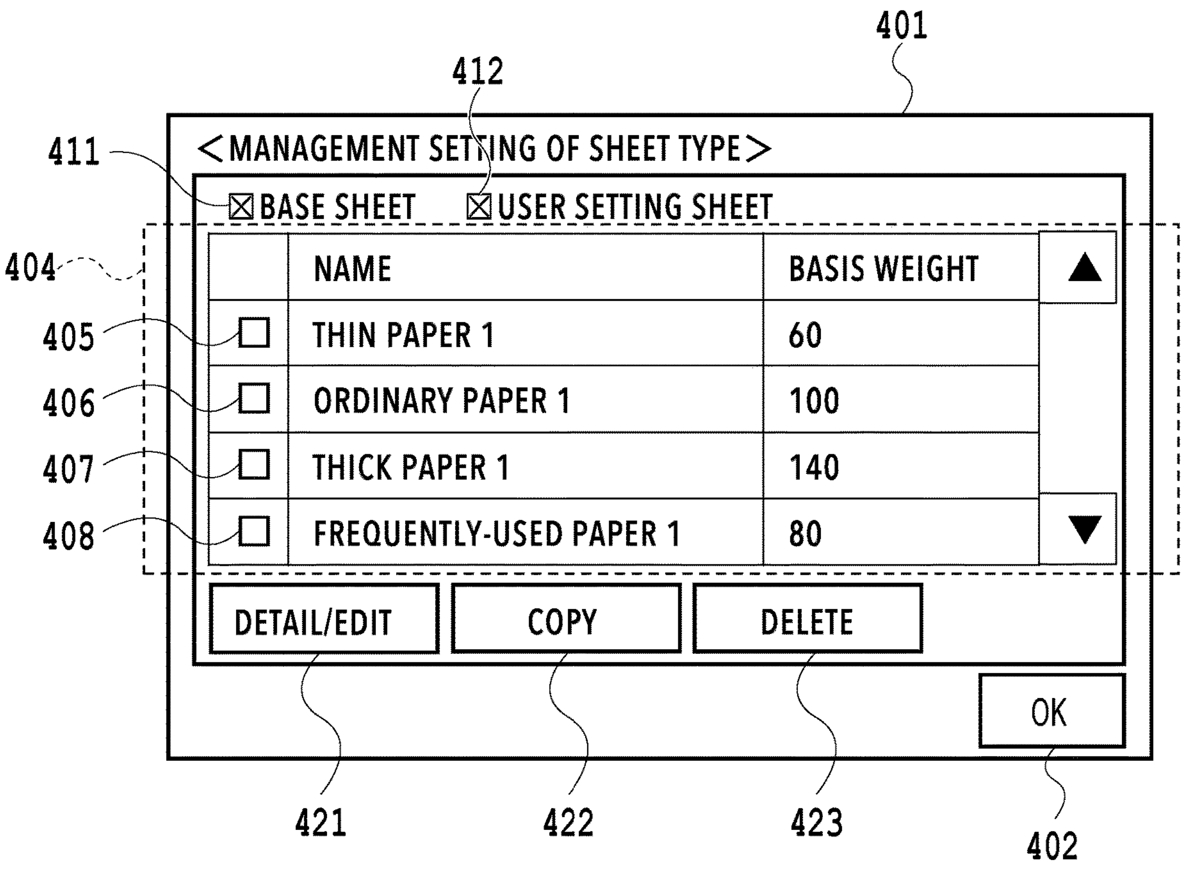
FIG. 4 is a diagram showing an example of a screen in a management setting mode displayed on an operation unit.

Next, management of sheet information by the sheet information management unit 304 in FIG. 3 will be described with reference to FIG. 4 to FIG. 8. FIG. 4 to FIG. 8 are diagrams showing examples of screens in respective operating modes displayed on the operation unit 212. Here, an operating mode is a mode for managing sheet information and is provided for each processing content as will be described later. FIG. 4 is a diagram showing an example of a screen in a management setting mode displayed on the operation unit 212. FIG. 4 shows an example in which a management setting window 401 is displayed while the operating mode is the management setting mode. The management setting window 401 includes a sheet information list 404. In FIG. 4, a checkbox 411 of a base sheet (also referred to as base information) and a checkbox 412 of a user setting sheet (also referred to as user setting information) are displayed in an upper area of the sheet information list 404.

In the example of FIG. 4, it is shown that both of the checkboxes 411 and 412 of the base sheet and user setting sheet are selected. Accordingly, in the sheet information list 404, information corresponding to the base sheet and information corresponding to the user setting sheet are extracted and displayed. The base sheet and the user setting sheet will be described later.

In the example of FIG. 4, of sheet information 405 to 408 included in the sheet information list 404, the sheet information 405 to 407 shows information corresponding to the base sheets. On the other hand, of the sheet information 405 to 408 included in the sheet information list 404, the sheet information 408 shows information corresponding to the user setting sheet. The sheet information 405 to 408 and sheet information other than the sheet information 405 to 408 are also collectively referred to as sheet information without distinction. Incidentally, the list shows the sheet information 405 to 408 in the example of FIG. 4, but is not limited to this. For example, in a case where the number of items of information displayed in the sheet information list 404 exceeds the maximum number of items displayed, a scrollbar may be displayed on the right end of the sheet information list 404. In a case where this scrollbar is operable, the sheet information list 404 includes displayable sheet information other than the sheet information 405 to 408.

Figure 6:
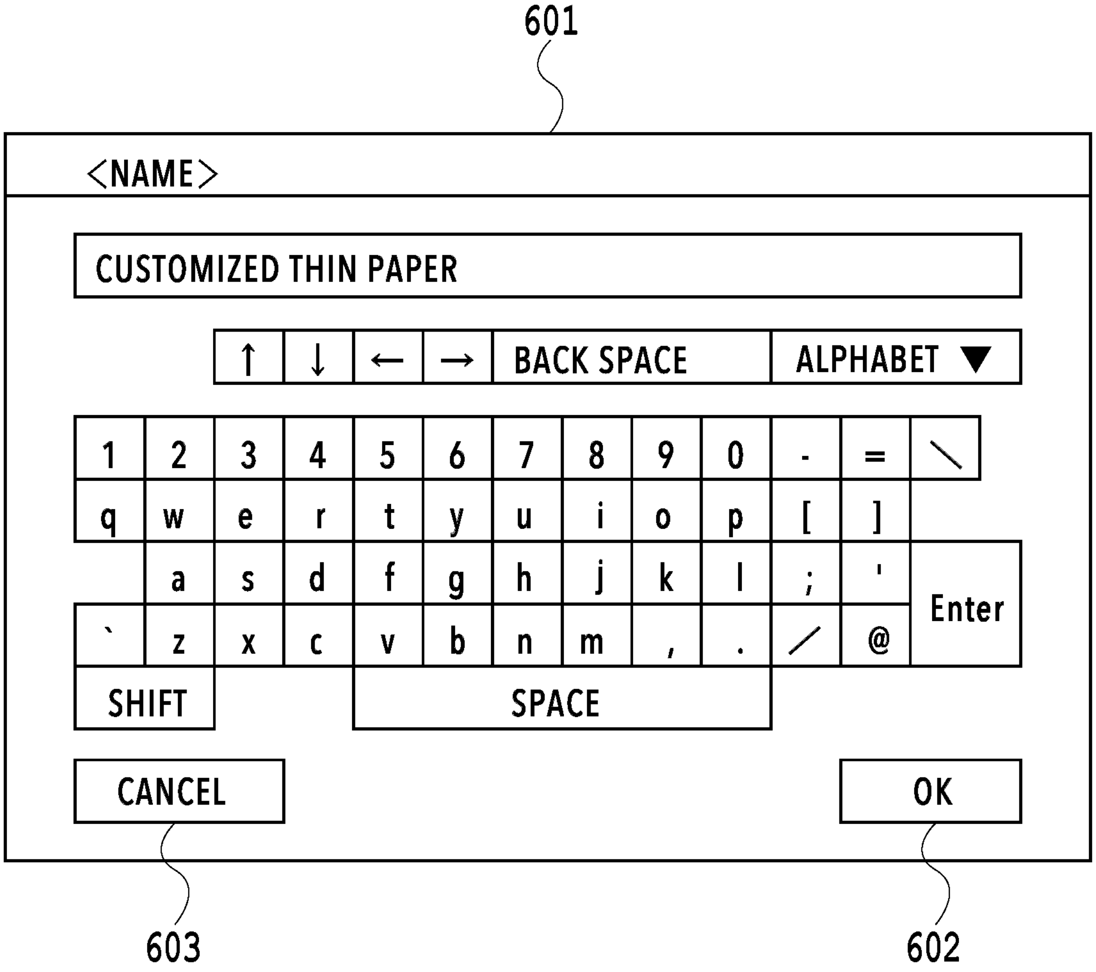
FIG. 6 is a diagram showing an example of a screen in a name edit mode displayed on the operation unit.

In a lower area of the sheet information list 404, a detail/edit button 421, a copy button 422, and a delete button 423 are shown from left to right in the drawing. In a case where the detail/edit button 421, the copy button 422, and the delete button 423 are not distinguished, they are collectively referred to as input buttons 420. The detail/edit button 421 is a button which implements a function of displaying details of sheet information and making them editable. The copy button 422 is a button which implements copying and storing sheet information selected from the sheet information list 404. More specifically, at the press of the copy button 422, a name registration window 601 of FIG. 6 is displayed to receive name input. The button also implements copying sheet information selected from the sheet information list 404, changing its name to the input one, and storing it as a user setting sheet. For example, in a case where a sheet selected from the sheet information list 404 is a base sheet and the copy button 422 is pressed, the button implements a function of copying sheet information corresponding to the base sheet and then making it editable. Incidentally, in a case where sheet information selected from the sheet information list 404 is copied, favorite information is not inherited. The delete button 423 is a button which implements a function of deleting sheet information. Incidentally, an OK button 402 at the lower right of the management setting window 401 is a button which implements a function of informing the system that the operation of the detail/edit button 421, the copy button 422, and the delete button 423 has been finished. In a case where the management setting window 401 of FIG. 4 is operated by a user, the input unit 303 of FIG. 3 detects the user operation and notifies the control unit 301 of FIG. 3 which place (also referred to as coordinates) is operated on the screen of the operation unit 212 of FIG. 2. The control unit 301 of FIG. 3 interprets which input button 420 is operated from a bitmap of the screen displayed on the operation unit 212 of FIG. 2 and the above coordinates and performs processing corresponding to the input button 420. After that, the control unit 301 of FIG. 3 generates a screen to be displayed next and notifies the display unit 302 of FIG. 3 of the content of the screen. In this manner, processing corresponding to user operation is executed and the screen of the operation unit 212 of FIG. 2 transitions according to each operating mode.

Base Sheet and User Setting Sheet

Next, the base sheet and the user setting sheet will be described. Each of the base sheet and the user setting sheet is an index to specify a type of sheet. Sheet information is set for each type of sheet. Sheet information includes at least one set value. Examples of a content specified by the set value are a name of a sheet, a type of the sheet, a surface property of the sheet, a color of the sheet, and information specifying an amount of adjustment of a secondary transfer voltage for the sheet. These set values are related to image quality of an image formed on the sheet.

Set Value

Of the contents specified by the set values, names of sheets are, for example, "thin paper 1," "ordinary paper 1," and "thick paper 1." More specifically, for example, the ordinary paper corresponds to uncoated paper with a rough surface. Other examples are high-quality paper, matte paper, and gloss paper. The high-quality paper corresponds to uncoated paper with a good surface property. The matte paper corresponds to coated paper without a gloss on its surface. The gloss paper corresponds to coated paper with a gloss on its surface. In a case where there are multiple types of ordinary paper, it is only necessary to add a number as a suffix in registering order, such as "ordinary paper 1" and "ordinary paper 2." For example, multiple types of ordinary paper are ordinary paper different in size, such as A4 ordinary paper and A3 ordinary paper. Alternatively, ordinary paper 1 and ordinary paper 2 may be different in basis weight.

Of the contents specified by the set values, types of sheets indicate types of sheets in editing of the sheet information list 404. For example, of the types of sheets, the base sheet is a set of default set values in which sheet information on a sheet assumed to be used basically such as ordinary paper or high-quality paper is preregistered at the time of shipment of the product. The base sheet is registered in the image processing apparatus 103 as a set of default set values. Thus, the base sheet is configured to be uneditable. Accordingly, in a case where sheet information specified as the base sheet is edited, the base sheet is copied. The copied base sheet is tentatively registered in the RAM 202 or HDD 204 by the sheet information management unit 304 as a temporary user setting sheet (also referred to as temporary user information or tentative sheet information) until sheet information is registered. In a case where the tentatively-registered temporary user setting sheet is definitively registered by the sheet information management unit 304, the temporary user setting sheet is registered as a user setting sheet (new sheet information). That is, the user setting sheet is shown as one obtained by copying the base sheet as a temporary user setting sheet, editing the temporary user setting sheet, and registering it after editing. Incidentally, in a case where the user setting sheet is selected from the sheet information list 404 and the detail/edit button 421 is pressed, a temporary user setting sheet is not generated.

Edit Mode

Figure 5:
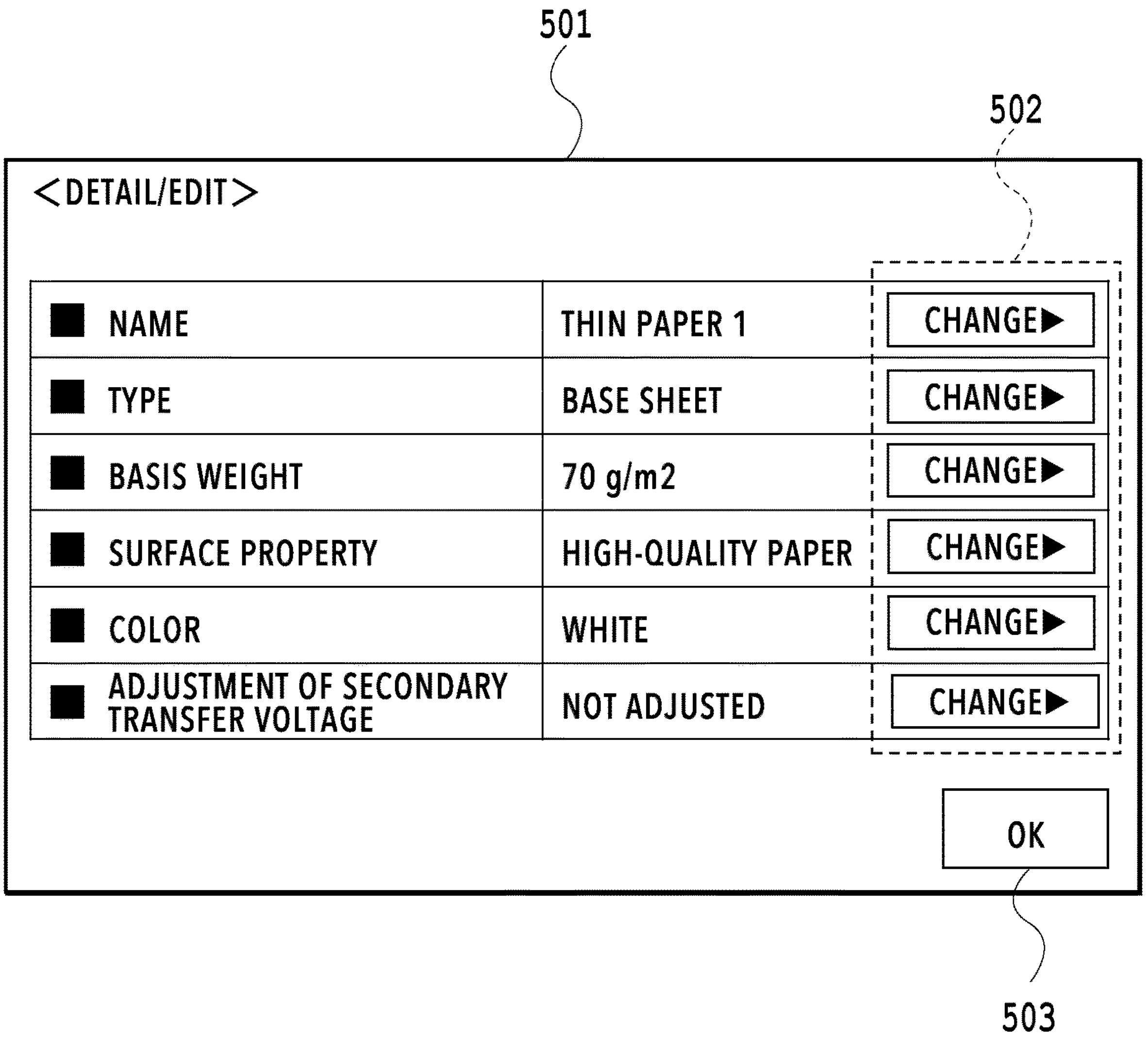
FIG. 5 is a diagram showing an example of a screen in an edit mode displayed on the operation unit.

For example, in a case where the detail/edit button 421 is operated after the base sheet is selected by a user from the base sheet and the user setting sheet in FIG. 4, transition is made to a screen which allows editing of sheet information. FIG. 5 is a diagram showing an example of a screen in an edit mode displayed on the operation unit 212. FIG. 5 shows an example in which an edit window 501 is displayed while the operating mode is the edit mode. As items specified by set values, the edit window 501 includes a name of a sheet, a type of the sheet, a basis weight of the sheet, a surface property of the sheet, a color of the sheet, and information specifying an amount of adjustment of a secondary transfer voltage for the sheet. As a button to change the item specified by each set value, a change button 502 is displayed on the right of each of the items specified by the set values. Transition is made to a set value change screen corresponding to the operated one of the change buttons 502. In the set value change screen, a change of a set value (edit content) of each item (edit target) is received and the changed set value is stored (updated).

Name Edit Mode

Upon operation of the change button 502 corresponding to the name of the sheet among the items, transition is made to a set value change screen to edit the name. FIG. 6 is a diagram showing an example of a screen in a name edit mode. FIG. 6 shows an example in which a name registration window 601 is displayed while the operating mode is the name edit mode. The name registration window 601 includes a keyboard to receive a change of the name of the sheet, an OK button 602, and a cancel button 603. In a case where the keyboard is operated and the OK button 602 is operated, the input unit 303 of FIG. 3 stores the content of the keyboard operation as a new name of the sheet. More specifically, in a case where the input unit 303 of FIG. 3 detects operation of the OK button 602 of FIG. 6, the control unit 301 of FIG. 3 changes the name of the set value, then stores it in the sheet information management unit 304 of FIG. 3, and returns to the management setting mode of FIG. 4. Although not illustrated, in the management setting mode of FIG. 4, newly-registered sheet information is displayed in the sheet information list 404. On the other hand, in a case where the cancel button 603 is operated after the keyboard is operated, the input unit 303 of FIG. 3 deletes the content of the keyboard operation and returns to the screen in the management setting mode of FIG. 4. For example, in the example of FIG. 6, the character string "CUSTOMIZED THIN PAPER" has been entered. After that, the content of operation is stored upon operation of the OK button 602 and is deleted upon operation of the cancel button 603. In short, the name can be edited by operating the change button 502 corresponding to the name of the sheet. This makes it possible to distinguish the sheet from other sheets based on the edited name of the sheet.

Figure 7:
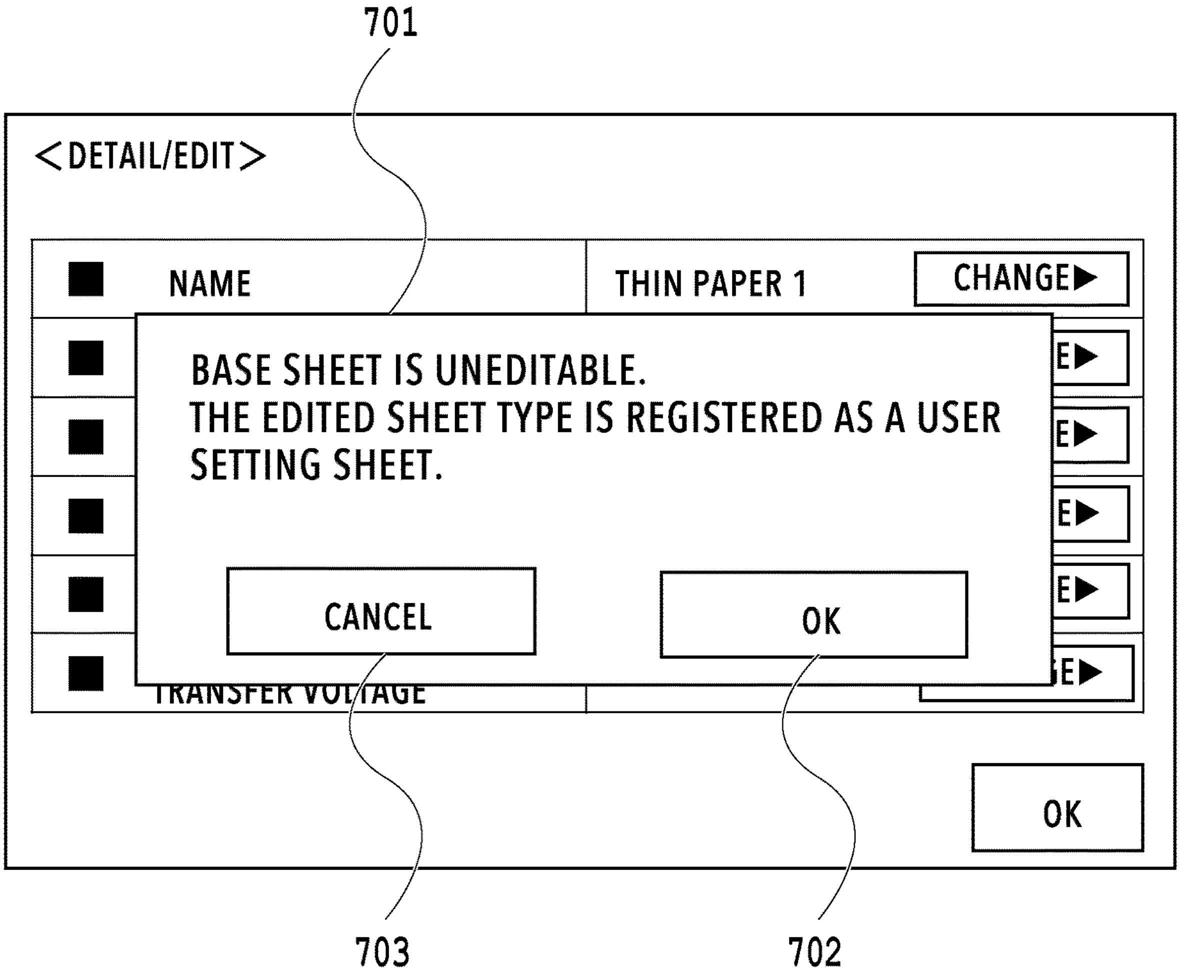
FIG. 7 is a diagram showing an example of a screen in a type edit mode displayed on the operation unit.

The description returns to FIG. 5. In a case where the change button 502 is operated, the set value is changed, and the OK button 503 is pressed, an edit screen of FIG. 7 to change sheet information is displayed. FIG. 7 is a diagram showing an example of the screen in the edit mode. FIG. 7 shows an example in which an edit impossibility notification window 701 is displayed while the operating mode is an edit mode of the base sheet. The edit impossibility notification window 701 is a popup (notification) screen which allows selection of whether to register the changed set value as new sheet information. A notification area of the edit impossibility notification window 701 displays the notification content "BASE SHEET IS UNEDITABLE. THE EDITED SHEET TYPE IS REGISTERED AS A USER SETTING SHEET." A cancel button 703 is displayed at the lower left of the notification area of the edit impossibility notification window 701. An OK button 702 is displayed at the lower right of the notification area of the edit impossibility notification window 701. In a case where the input unit 303 of FIG. 3 detects operation of the cancel button 703, the control unit 301 of FIG. 3 returns to the screen in the management setting mode of FIG. 4 without storing the set value.

In contrast, in a case where the input unit 303 of FIG. 3 detects operation of the OK button 702, the control unit 301 of FIG. 3 changes the set value, then stores it in the sheet information management unit 304 of FIG. 3, and returns to the screen in the management setting mode of FIG. 4. Although not illustrated, the newly-registered sheet information is displayed in the sheet information list 404 of FIG. 4. More specifically, the control unit 301 of FIG. 3 copies the base sheet and generates a temporary user setting sheet. Since the type of sheet is changed to the user setting sheet after generation and registration of the temporary user setting sheet, the type of sheet is displayed as the user setting sheet. However, the type of sheet may be displayed as the base sheet until the sheet information is edited and changed.

Basis Weight Edit Mode; Surface Property Edit Mode; Color Edit Mode

Returning to FIG. 5, upon operation of the change button 502 corresponding to the basis weight of the sheet among the items, transition is made to a set value change screen to edit the basis weight of the sheet. More specifically, the basis weight of the sheet can be edited while the operating mode is a basis weight edit mode. Here, the basis weight indicates a weight of paper per unit area. Although $g/m^2$ (grams per square meter) is used in the present embodiment, any other unit may be used instead. For example, a ream weight may be used. The ream weight indicates a weight of 1,000 sheets of paper. On the other hand, upon operation of the change button 502 corresponding to the surface property of the sheet among the items, transition is made to a set value change screen to edit the surface property of the sheet. More specifically, the surface property of the sheet can be edited while the operating mode is a surface property edit mode. Here, the surface property indicates roughness of a surface of paper. In the example of FIG. 5, the surface property of the sheet is shown by "high-quality paper." Alternatively, the surface property of the sheet may be shown by "ordinary paper." Alternatively, the surface property of the sheet may be shown by "recycled paper." Incidentally, although a sheet having a basis weight greater than 90 $g/m^2$ is generally treated as thick paper, the surface of thick paper or ordinary paper is often processed plain. Thus, it is possible to indicate the surface property of the sheet by "high-quality paper" or the like. On the other hand, upon operation of the change button 502 corresponding to the color of the sheet among the items, transition is made to a set value change screen to edit the color of the sheet. More specifically, the color of the sheet can be edited while the operating mode is a color edit mode. In the example of FIG. 5, the color of the sheet is shown by "white." Incidentally, although names representing standard colors such as white, red, and blue are designated in the present embodiment, any other color such as a DIC color (color in the color guide issued by DIC Corporation) may be used as long as it can be distinguished from the other colors. On the other hand, upon operation of the change button 502 corresponding to the information specifying the amount of adjustment of the secondary transfer voltage for the sheet among the items, transition is made to a set value change screen to adjust the secondary transfer voltage for the sheet.

Secondary Transfer Voltage Edit Mode

Figure 8:
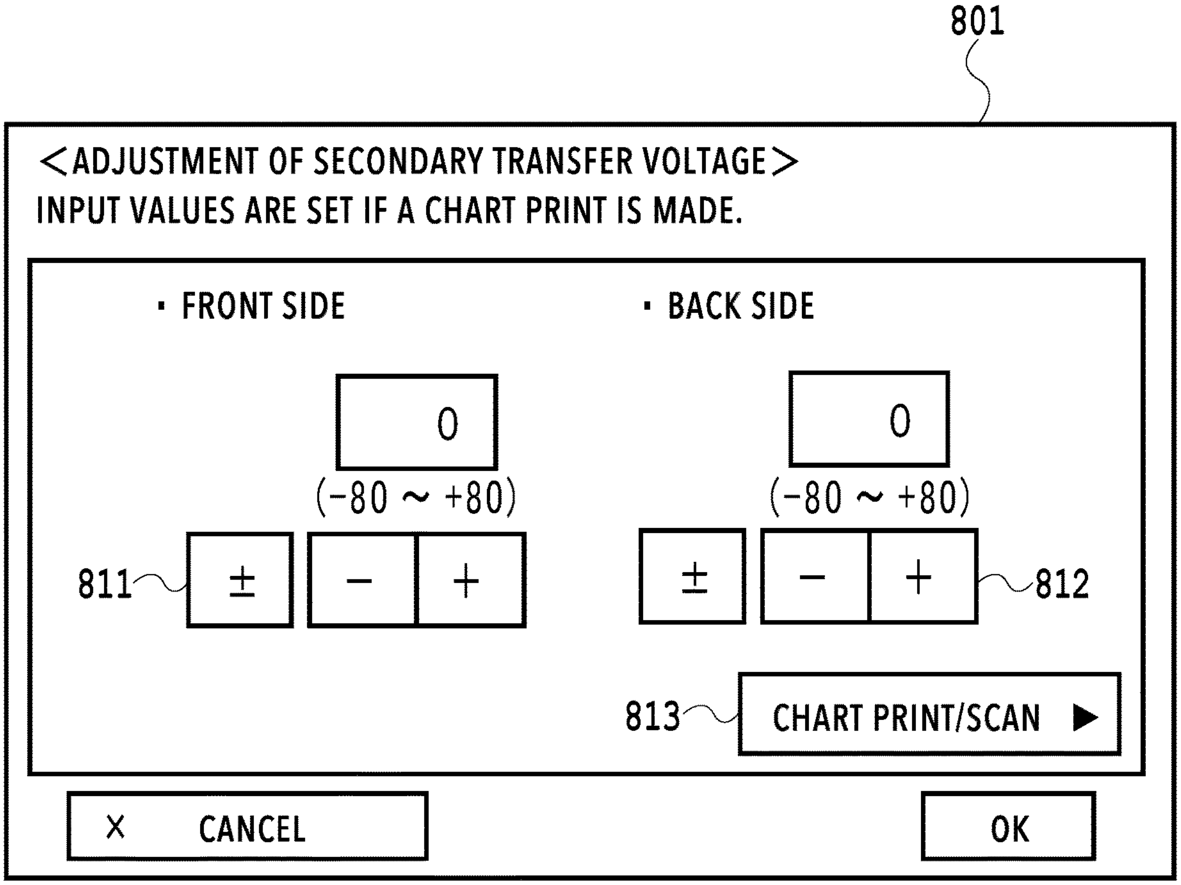
FIG. 8 is a diagram showing an example of a screen in a secondary transfer voltage edit mode displayed on the operation unit.

FIG. 8 is a diagram showing an example of a screen in a secondary transfer voltage edit mode. FIG. 8 shows an example in which a secondary transfer voltage edit window 801 is displayed while the operating mode is the secondary transfer voltage edit mode. The secondary transfer voltage edit window 801 can adjust deposition of toner on an output sheet which is a print medium. The secondary transfer voltage edit window 801 includes an adjustment button 811, an adjustment button 812, and a chart print/scan button 813. The adjustment button 811 is a button which can adjust the secondary transfer voltage for a front side of the output sheet. The adjustment button 812 is a button which can adjust the secondary transfer voltage for a back side of the output sheet. The secondary transfer voltage is manually adjusted by the adjustment buttons 811 and 812. The chart print/scan button 813 is a button which enables automatic adjustment of the secondary transfer voltage. In a case where the chart print/scan button 813 is operated, the control unit 301 of FIG. 3 transitions the operating mode to a secondary transfer voltage automatic adjustment mode.

Secondary Transfer Voltage Automatic Adjustment Mode

Figure 9A:
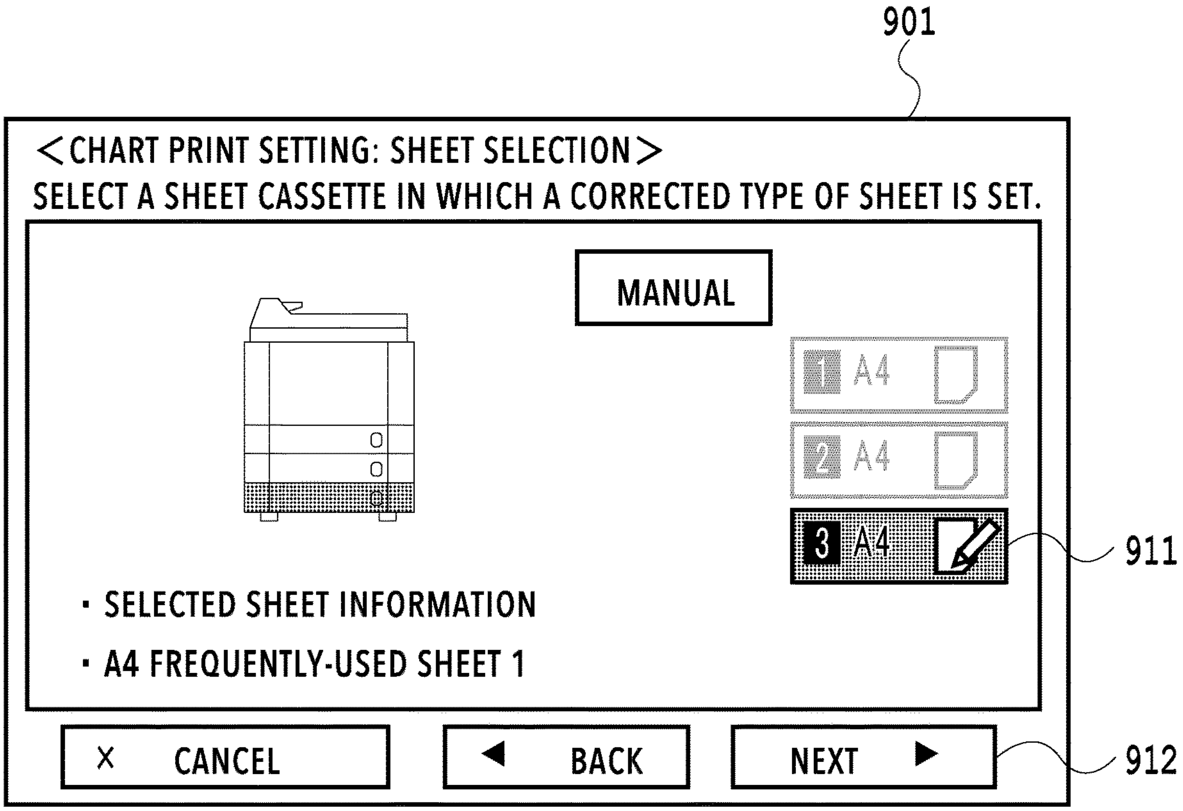
FIGS. 9A and 9B are diagrams showing an example of screens in a secondary transfer voltage automatic adjustment mode displayed on the operation unit.
Figure 9B:
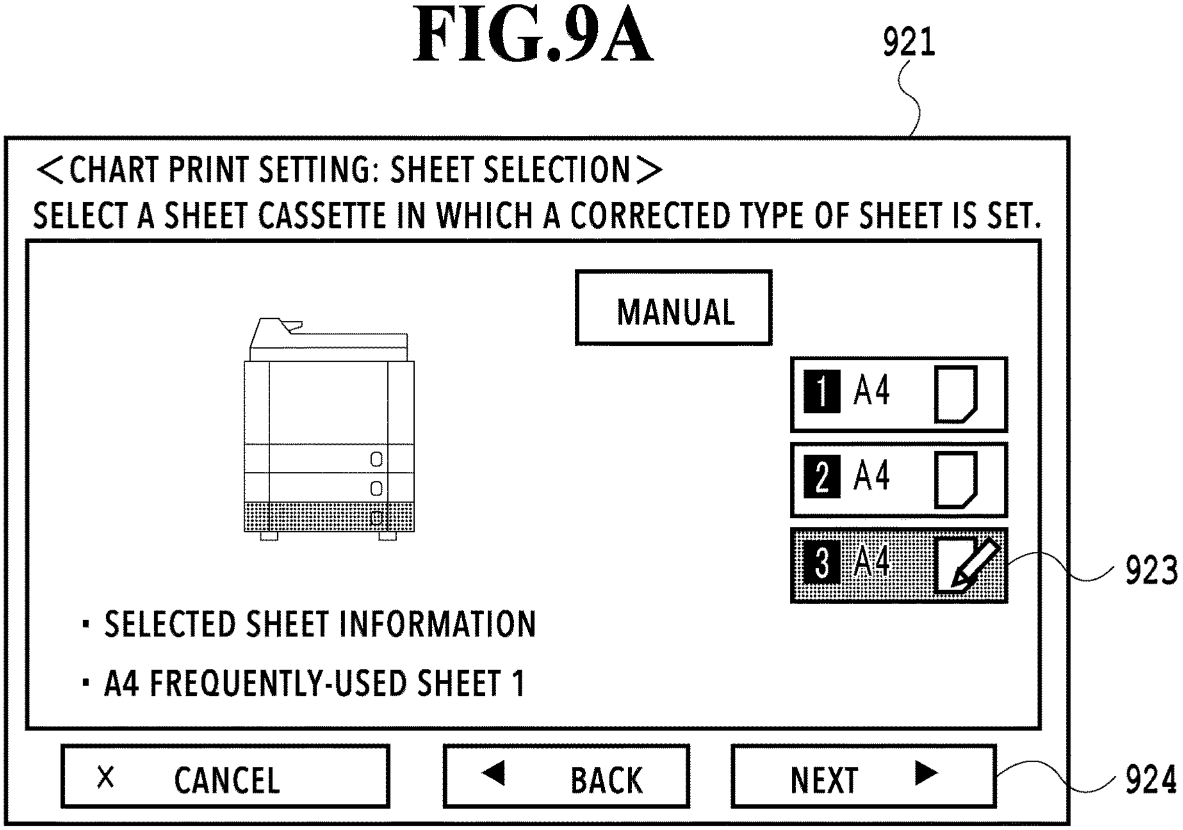

FIGS. 9A and 9B are diagrams showing an example of screens in the secondary transfer voltage automatic adjustment mode displayed on the operation unit 212. FIG. 9A shows a sheet selection window 901 to select a target of adjustment of the secondary transfer voltage in a case where the user setting sheet is selected in the management setting window 401 of FIG. 4. A sheet feeding tray button 911 is arranged in the sheet selection window 901 of FIG. 9A. The sheet feeding tray button 911 is a button corresponding to a selectable sheet feeding tray among a plurality of sheet feeding trays of the image processing apparatus 103. FIG. 9A shows an example in which only the lowermost sheet feeding tray of the sheet feeding trays of the image processing apparatus 103 is arranged as the sheet feeding tray button 911 so as to be selectable. In a case where the input unit 303 of FIG. 3 detects operation of the sheet feeding tray button 911 of FIG. 9A and operation of a next button 912, the control unit 301 of FIG. 3 displays a chart print start window 1001 as described below with reference to FIG. 10.

Figure 10:
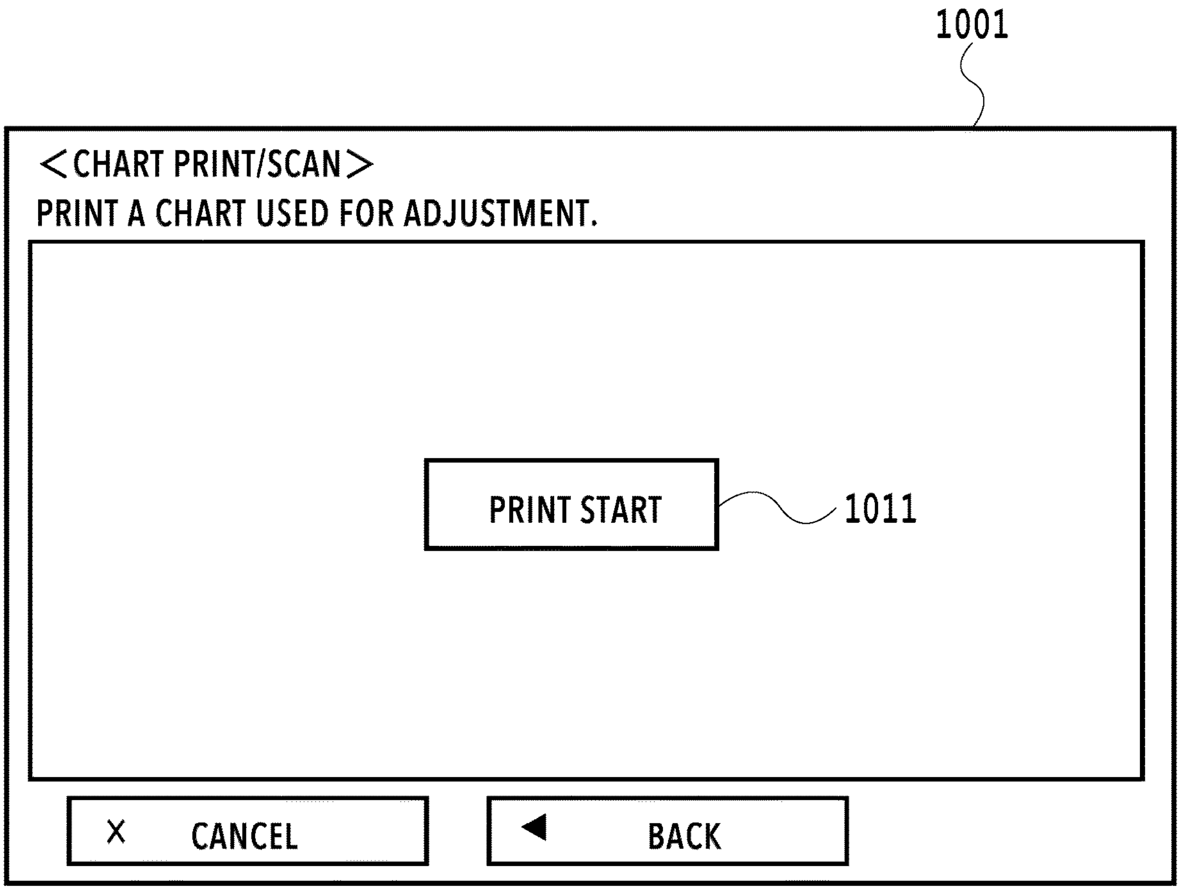
FIG. 10 is a diagram showing an example of a chart print start window displayed on the operation unit.

FIG. 10 is a diagram showing an example of the chart print start window 1001 displayed on the operation unit 212. FIG. 10 shows an example of the chart print start window 1001 to print a chart for automatic adjustment of the secondary transfer voltage on a print medium which is a target of adjustment of the secondary transfer voltage selected in FIG. 9A or 9B. A print start button 1011 is arranged in the chart print start window 1001. In a case where the input unit 303 of FIG. 3 detects operation of the print start button 1011, the printer 295 of FIG. 2 prints a chart and the control unit 301 of FIG. 3 displays an adjustment window 1101 as described below with reference to FIG. 11.

Adjustment Target: User Setting Sheet

Figure 11:
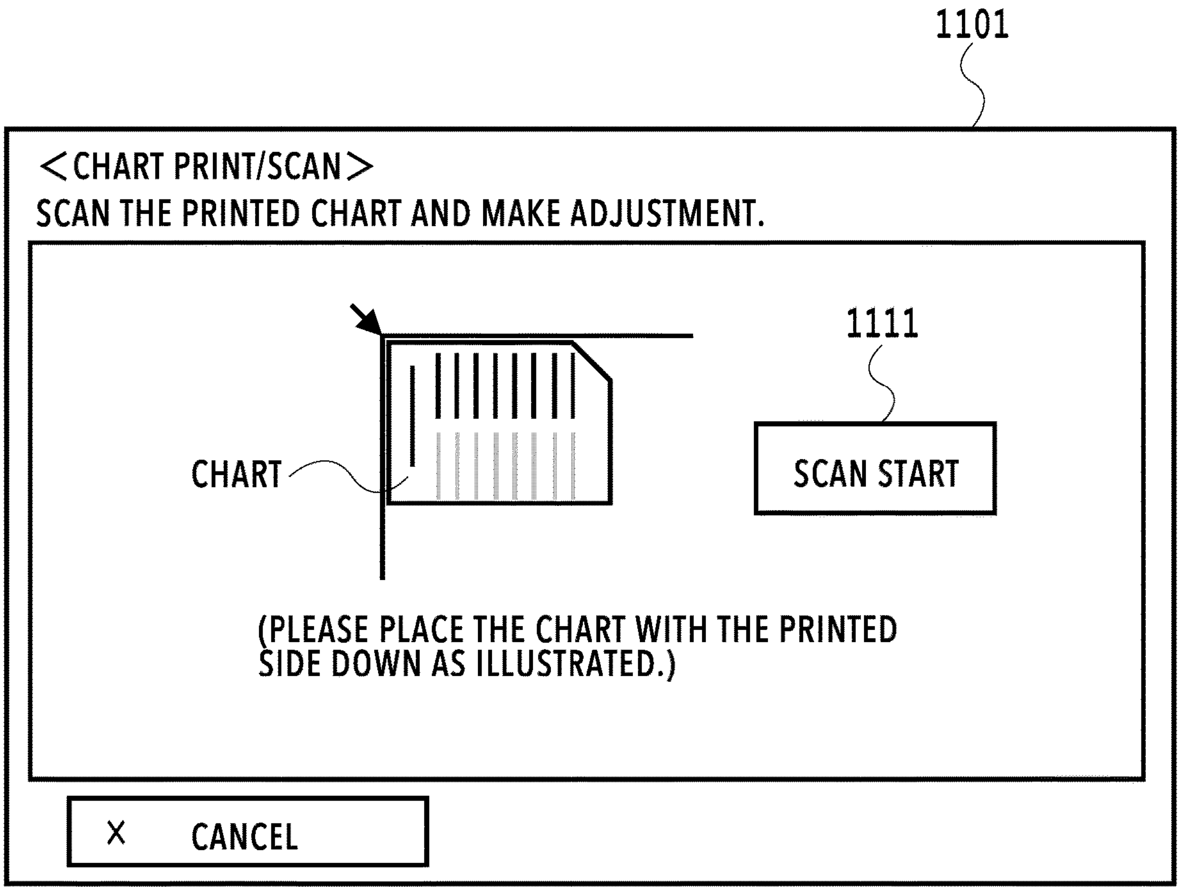
FIG. 11 is a diagram showing an example of an adjustment window displayed on the operation unit.

A case where the adjustment target is the user setting sheet will be described. FIG. 11 is a diagram showing an example of the adjustment window 1101 displayed on the operation unit 212. A scan start button 1111 is arranged in the adjustment window 1101 of FIG. 11. In a case where the input unit 303 of FIG. 3 detects operation of the scan start button 1111, the scanner 270 of FIG. 2 scans the chart placed on a document plate. The control unit 301 of FIG. 3 automatically adjusts the secondary transfer voltage based on the scan result, changes the set value of the adjustment target user setting sheet, and stores it in the sheet information management unit 304. After that, the display content of the operation unit 212 is returned from the display of the adjustment window 1101 of FIG. 11 to the display of the secondary transfer voltage edit window 801 of FIG. 8. Incidentally, although FIG. 11 shows an example of automatic adjustment using a pressing plate of the scanner 270 of FIG. 2, the adjustment is not limited to this. In a situation in which an automatic document feeder (ADF) is provided in the scanner 270 of FIG. 2, the automatic adjustment may use the ADF.

Incidentally, in the automatic adjustment of the secondary transfer voltage, in a case where the scan shows that deposition of ink does not reach a predetermined amount, it is only necessary to increase the secondary transfer voltage. The deposit amount of toner is thus increased and the deposition of ink can be improved.

Adjustment Target: Temporary User Setting Sheet

A case where the adjustment target is a temporary user setting sheet will be described. In a case where the base sheet is selected and the detail/edit button 421 is operated in the management setting window 401 of FIG. 4 and the change button 502 of FIG. 5 is operated, the base sheet is copied. The copied base sheet is tentatively registered as a temporary user setting sheet. However, the temporary user setting sheet is not set to any of the sheet feeding trays. There is no selectable sheet feeding tray. Thus, an arbitrary sheet feeding tray is made selectable.

Sheet Feeding Tray

FIG. 9B shows a sheet selection window 921 to select an adjustment target of the secondary transfer voltage in a case where the base sheet is selected in the management setting window 401 of FIG. 4. In FIG. 9B, an arbitrary sheet feeding tray of the sheet feeding trays of the image processing apparatus 103 can be selected. A sheet feeding tray button 923 of FIG. 9B is a button corresponding to a sheet feeding tray selected by a user from the sheet feeding trays of the image processing apparatus 103. In a case where the input unit 303 of FIG. 3 detects operation of the sheet feeding tray button 923 of FIG. 9B and operation of a next button 924, the control unit 301 of FIG. 3 displays the chart print start window 1001 shown in FIG. 10. In this manner, in a case where a new sheet as a print medium is adjusted and registered, an arbitrary sheet feeding tray is made selectable and the adjustment target sheet can be registered in the selected sheet feeding tray. This saves the trouble to make settings of the sheet in advance. More specifically, since the temporary user setting sheet is the copy of the base sheet, there is a sheet feeding tray originally assigned to that base sheet. Thus, there is no problem in assigning this sheet feeding tray as an arbitrary sheet feeding tray for the temporary user setting sheet. Add to this, in the present embodiment, the temporary user setting sheet that is now going to be adjusted is assigned to a sheet feeding tray regardless of what has been already set to the sheet feeding tray. Incidentally, although an arbitrary sheet feeding tray is selectable in FIG. 9B, in a case where a sheet feeding tray set to a sheet size not able to print the chart is selected, the selection operation may be rejected.

Operation Example

Figure 12:
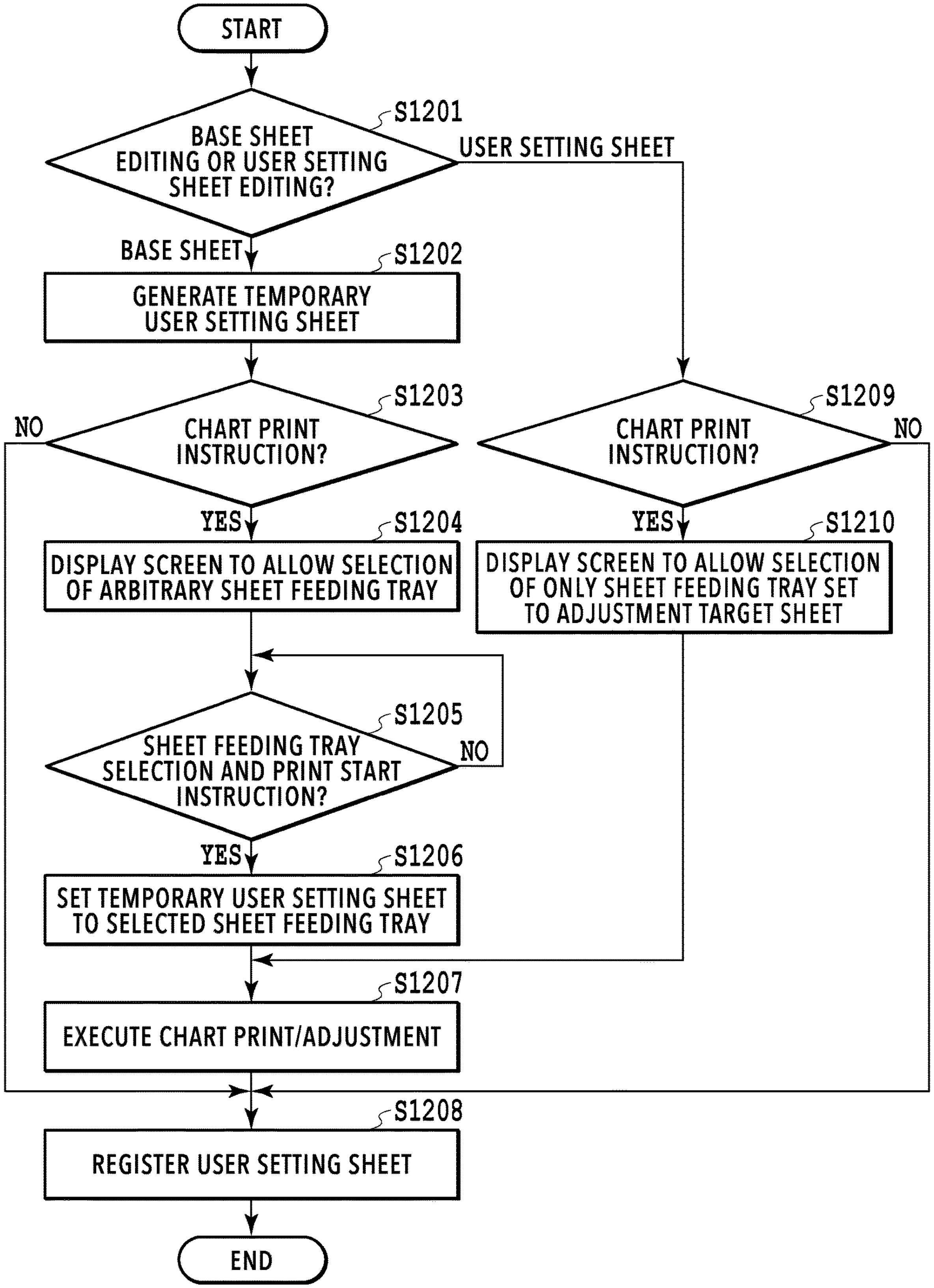
FIG. 12 is a flowchart showing an example of processing of editing sheet information.

Next, an operation example of editing of sheet information will be described. FIG. 12 is a flowchart showing an example of processing of editing sheet information. In the operation example shown in FIG. 12, in a case where a target to be edited is a base sheet, the base sheet is copied to generate a temporary user setting sheet and, in a case where there is further an instruction for a chart print, an arbitrary sheet feeding tray is made selectable. Part or all of the functions of the steps in FIG. 12 may be implemented by hardware such as an ASIC or electronic circuit. Sign "S" in the description of each process means a step in the flowchart diagram. For example, processing from S1201 to S1210 in the flowchart of FIG. 12 is implemented by firmware. The firmware is stored in the HDD 204 of the image processing apparatus 103, loaded into the RAM 202, and executed by the CPU 201. The flowchart of FIG. 12 is started on the basis that the control unit 301 receives detection of operation of the detail/edit button 421 of FIG. 4 by the input unit 303.

Editing of Base Sheet

In S1201, the CPU 201 determines which of the base sheet and the user setting sheet is selected in the management setting window 401 of FIG. 4. In a case where it is determined that the base sheet is selected, the CPU 201 proceeds to S1202. In S1202, the CPU 201 generates a temporary user setting sheet by copying the base sheet and proceeds to S1203. More specifically, the CPU 201 copies set values included in the base sheet. The CPU 201 tentatively registers the temporary user setting sheet in the sheet information management unit 304 to store the copied set values temporarily in the RAM 202 or HDD 204.

In S1203, the CPU 201 determines the presence/absence of a chart print instruction. The chart print instruction is an instruction to print a chart for automatic adjustment of the secondary transfer voltage. In a case where it is determined that the chart print instruction is present, the CPU 201 proceeds to S1204. In a case where it is determined that the chart print instruction is absent, the CPU 201 proceeds to S1208. Here, the presence of the chart print instruction corresponds to operation of the chart print/scan button 813 of FIG. 8. In S1204, the CPU 201 displays a screen which allows selection of an arbitrary sheet feeding tray and proceeds to S1205. For example, the CPU 201 displays the sheet selection window 921 of FIG. 9B. In the example of FIG. 9B, buttons to select sheet feeding trays other than the sheet feeding tray button 903 are also displayed in a selectable state without being hatched or grayed out. In S1205, the CPU 201 determines whether a sheet feeding tray is selected and a print start instruction is issued. In a case where it is determined that a sheet feeding tray is selected and a print start instruction is issued, the CPU 201 proceeds to S1206. In a case where it is determined that a sheet feeding tray is not selected and a print start instruction is not issued, the CPU 201 continues the process of S1205. Here, a sheet feeding tray being selected and a print start instruction being issued correspond to operation of the print start button 1011 of FIG. 10.

In S1206, the CPU 201 sets the temporary user setting sheet to the selected sheet feeding tray and proceeds to S1207. Here, setting the temporary user setting sheet to the selected sheet feeding tray corresponds to associating the selected sheet feeding tray with the temporary user setting sheet and storing this association in the sheet information management unit 304 of FIG. 3 as tentative registration. In S1207, the CPU 201 prints a chart, performs automatic adjustment, and proceeds to S1208. To be more specific, this corresponds to setting of the printed chart on the scanner 270, operation of the scan start button 1111 of FIG. 1, and execution of automatic adjustment. In S1208, the CPU 201 performs a user setting registration process and finishes the processing of this flowchart. The user setting registration process corresponds to registration and storage of the temporary user setting sheet in the sheet information management unit 304 as a user setting sheet upon detection of operation of the OK button 503 of FIG. 5.

Incidentally, as described above in detail, the edit window 501 includes, as items specified by set values, a name of a sheet, a type of the sheet, a basis weight of the sheet, a surface property of the sheet, a color of the sheet, and information specifying an amount of adjustment of a secondary transfer voltage for the sheet. The change button 502 is displayed on the right of each of the items specified by the respective set values. Upon operation of any of the change buttons 502, the operating mode transitions to the edit mode and the corresponding set value is made editable. More specifically, the set value is edited through the detail/edit button 421 of FIG. 4 and the change button 502 of FIG. 5 and the edited set value is registered by operating the OK button 503 of FIG. 5.

Editing of User Setting Sheet

In contrast, in a case where it is determined that the user setting sheet is selected, the CPU 201 proceeds to S1209. In S1209, the CPU 201 determines the presence/absence of a chart print instruction. In a case where it is determined that the chart print instruction is present, the CPU 201 proceeds to S1210. In a case where it is determined that the chart print instruction is absent, the CPU 201 proceeds to S1208. In S1210, the CPU 201 displays a screen which allows selection of only a sheet feeding tray set to the adjustment target sheet. More specifically, as shown in FIG. 9A, of the buttons showing the sheet feeding trays, grayed out or hatched buttons correspond to sheet feeding trays not set to the adjustment target sheet. In contrast, of the buttons showing the sheet feeding trays, a selectable button corresponds to a sheet feeding tray set to the adjustment target sheet. On the other hand, in S1208, the CPU 201 registers the set value edited via the edit window 501. To be more specific, as the set value, at least any one of the following is edited: the name of the sheet, the type of the sheet, the basis weight of the sheet, the surface property of the sheet, the color of the sheet, and the information specifying the amount of adjustment of the secondary transfer voltage for the sheet. After the editing of any of these set values, the edited set value is newly registered by operation of the OK button 503 of FIG. 5. In this case of new registration, the CPU 201 may write only the edited value over the existing value. In this case, the current user setting sheet has undergone the overwriting edit. Alternatively, in this case of new registration, the CPU 201 may newly generate a user setting sheet itself from the edited set value and the unedited set values. In this case, the current user setting sheet remains unchanged and the new user setting sheet reflecting the edit is registered.

Advantageous Result of Operation

According to the above operation, in a case where sheet information corresponding to a new sheet is edited, a base sheet registered as a default can be copied as a temporary user setting sheet and set values can be edited. This removes the necessity for the work to register the set values included in the sheet information corresponding to the new sheet from the beginning. As a result, data for printing suitable for the sheet can be obtained without spending time and trouble. In addition, in a case where a new sheet is adjusted and registered, an arbitrary sheet feeding tray can be made selectable by the process of S1204 and the adjustment target sheet can be registered in the selected sheet feeding tray by the process of S1206. This also saves the trouble to make settings of the sheet in advance. Incidentally, although the present embodiment enables selection and setting of an arbitrary sheet feeding tray at the time of adjustment of the secondary transfer voltage, the selection and setting may be allowed also in any other automatic adjustment function such as image position adjustment. Further, in a case where the cancel button 703 FIG. 7 is operated and the registration of the sheet information is canceled after the temporary user setting sheet is registered in the selected sheet feeding tray by the process of S1206, the following processing may be executed. That is, the sheet feeding tray set to the temporary user setting sheet may be returned to the sheet information before the setting.

Conclusion

As described above, in a case where the input unit 303 of FIG. 3 detects operation of the OK button 503 in the edit window 501 of FIG. 5, the control unit 301 of FIG. 3 determines whether the set values are changed. In a case where it is determined that none of the set values are changed, the control unit 301 of FIG. 3 returns to the management setting window of FIG. 4 without storing the set values. In contrast, in a case where it is determined that one or more of the set values are changed, the control unit 301 of FIG. 3 determines whether the sheet information that is currently being edited is a user setting sheet or a temporary user setting sheet.

In a case where it is determined to be a user setting sheet, the control unit 301 of FIG. 3 stores the set values in the sheet information management unit 304 of FIG. 3 and returns to the management setting window of FIG. 4. In contrast, in a case where it is determined to be a temporary user setting sheet, the control unit 301 of FIG. 3 determines whether a name of the sheet is changed from the name of the sheet corresponding to the original base sheet. In a case where it is determined that the name of the sheet is changed from the name of the sheet corresponding to the original base sheet, the control unit 301 of FIG. 3 stores the set value in the sheet information management unit 304 of FIG. 3. After that, the control unit 301 of FIG. 3 returns to the management setting window of FIG. 4 without displaying the name registration window 601 of FIG. 6 or the edit impossibility notification window 701 of FIG. 7. Although not illustrated, in the management setting window of FIG. 4, the newly-registered sheet information is displayed in the sheet information list 404. In contrast, in a case where it is determined that the name of the sheet is not changed from the name of the sheet corresponding to the original base sheet, the control unit 301 of FIG. 3 transitions the edit window 501 of FIG. 5 to the edit impossibility notification window 701 of FIG. 7.

Incidentally, in a case where the screen in the edit mode of FIG. 5 is displayed only for confirmation of details of sheet information, the interface may be configured such that the change buttons 502 of FIG. 5 do not accept user operation. For example, the change buttons 502 may be hidden. Alternatively, the change buttons 502 may be hatched to show that user operation is not accepted. Alternatively, the change buttons 502 may be hidden or hatched depending on a logged-in user. For example, in a case where a logged-in user is not authorized to edit sheet information, the change buttons 502 may be hidden or hatched. Alternatively, in a case where the base sheet is selected and the detail/edit input button 403 is operated after the number of registration of sheet information reaches its upper limit, a temporary user setting sheet cannot be generated. Also in this case, the change buttons 502 of FIG. 5 may be hidden or hatched.

Other Embodiments

In the embodiment described above, the description has been made based on the assumption that sheet information is used in the same image processing apparatus 103. However, the configuration is not limited to this example. Sheet information can be exported to and used in any apparatus of the same model as the image processing apparatus 103. Further, sheet information can be imported from any apparatus of the same model as the image processing apparatus 103 and used in the image processing apparatus 103.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-169308, filed Sep. 29, 2023, which is hereby incorporated by reference herein in its entirety.

What is claimed is:

1. An image processing apparatus, comprising:

a memory containing instructions and a processor for executing the instructions to operate as:

a registration unit to register sheet information including a plurality of set values, with the sheet information being information of each of a plurality sheets;

a setting unit to set the sheet information on a sheet including a plurality of set values to each of a plurality of sheet feeding trays; and a display control unit configured to display a plurality of sheet information, the plurality of sheet information including a first type of sheet information and a second type of sheet information different from the first type of sheet information, wherein in a case where an instruction for changing at least one of the set values included in the first type of sheet information is received, the registration unit copies the first type of sheet information as tentative sheet information for new sheet information, in a case where a chart print instruction for adjusting image quality of an image being formed on a sheet is received, the display control unit displays a first screen being selectable for all sheet feeding trays of the plurality of sheet feeding trays, and in a case where an instruction for changing at least one of the set values included in the second type of sheet information is received and the chart print instruction is received, the display control unit displays a second screen being selectable for the sheet feeding tray in which the second type of sheet information is set and not being selectable for the sheet feeding tray in which the second type of sheet information is not set.

2. The image processing apparatus according to claim 1, wherein in a case where a chart print is made to adjust image quality of an image formed on the sheet, the setting unit allows all of the sheet feeding trays to be set to the tentative sheet information.

3. The image processing apparatus according to claim 2, wherein in a case where the image quality is adjusted based on the chart print, the registration unit registers the tentative sheet information as new sheet information while maintaining the sheet information.

4. The image processing apparatus according to claim 3, wherein in a case where the chart print is made and an instruction to change at least one of the set values included in the new sheet information is received, the setting unit makes a setting to enable use of a sheet feeding tray associated with the new sheet information among the sheet feeding trays.

5. The image processing apparatus according to claim 3, wherein the new sheet information is an index to specify a type of the sheet and is information obtained by adjusting the image quality based on the chart print after editing of at least one of the set values.

6. The image processing apparatus according to claim 2, wherein the registration unit registers a set value obtained by adjusting the image quality based on the chart print as a part of the set values in the new sheet information, and the part of the set values is information specifying an amount of adjustment of a secondary transfer voltage for the sheet.

7. The image processing apparatus according to claim 1, wherein the first type of sheet information is information on default set values preregistered at a time of product shipment as the sheet information including the set values.

8. The image processing apparatus according to claim 1, wherein the second type of sheet information is information which is registered as the sheet information including the set value changed by user from default set value included in the first type of the sheet information.

9. The image processing apparatus according to claim 1, wherein the tentative sheet information is set to the sheet feeding tray selected in the first screen.

10. The image processing apparatus according to claim 1, wherein in a case where the tentative sheet information is set for the sheet feeding tray selected in the first screen and the chart print instruction is performed, the registration unit registers the tentative sheet information as the second type of sheet information.

11. The image processing apparatus according to claim 1, wherein in a case where the tentative sheet information is set for the sheet feeding tray selected in the first screen and the chart print instruction is performed, the registration unit registers the tentative sheet information as the second type of sheet information and the sheet information in which the tentative sheet information is registered as the second type of sheet information is set for the sheet feeding tray selected in the first screen.

12. The image processing apparatus according to claim 1, wherein in a case where an instruction for changing at least one of the set values included in the first type of sheet information is received and the chart print instruction is received, the chart print is performed using a sheet in the sheet feeding tray selected in the first screen.

13. The image processing apparatus according to claim 1, wherein in a case where an instruction for changing at least one of the set values included in the second type of sheet information is received and the chart print instruction is received, the chart print is performed using a sheet in the sheet feeding tray selected in the second screen.

14. A method of controlling an image processing apparatus, the method comprising:

a registering step of registering sheet information including a plurality of set values, with the sheet information being information of each of a plurality sheets;

a setting step of setting the sheet information to each of a plurality of sheet feeding trays; and a display controlling step of displaying a plurality of the sheet information, the plurality of the sheet information including a first type of sheet information and a second type of sheet information different from the first type of sheet information, wherein in the registering step, in a case where an instruction for changing at least one of the set values included in the first type of sheet information is received, copying the first type of sheet information as tentative sheet information for new sheet information, in a case where a chart print instruction for adjusting image quality of an image being formed on a sheet is received, displaying a first screen being selectable for all sheet feeding trays of the plurality of sheet feeding trays, and in a case where an instruction for changing at least one of the set values included in the second type of sheet information is received and the chart print instruction is received, displaying a second screen being selectable for the sheet feeding tray in which the second type of sheet information is set and not being selectable for the sheet feeding tray in which the second type of sheet information is not set.

15. A non-transitory computer-readable storage medium storing a program to cause a computer to:

register sheet information including a plurality of set values, with the sheet information being information of each of a plurality sheets;

set the sheet information to each of a plurality of sheet feeding trays; and control displaying a plurality of sheet information, the plurality of the sheet information including a first type of sheet information and a second type of sheet information different from the first type of sheet information, wherein in a case where an instruction for changing at least one of the set values included in the first type of sheet information is received, copy the first type of sheet information as tentative sheet information for new sheet information, in a case where a chart print instruction for adjusting image quality of an image being formed on a sheet is received, display a first screen being selectable for all sheet feeding trays of the plurality of sheet feeding trays, and in a case where an instruction for changing at least one of the set values included in the second type of sheet information is received and the chart print instruction is received, display a second screen being selectable for the sheet feeding tray in which the second type of sheet information is set and not being selectable for the sheet feeding tray in which the second type of sheet information is not set.

* * * * *